United States Patent
Ballantine et al.

(10) Patent No.: US 7,846,599 B2
(45) Date of Patent: Dec. 7, 2010

(54) METHOD FOR HIGH TEMPERATURE FUEL CELL SYSTEM START UP AND SHUTDOWN

(75) Inventors: Arne Ballantine, Palo Alto, CA (US); James McElroy, Suffield, CT (US)

(73) Assignee: Bloom Energy Corporation, Sunnyvale, CA (US)

(*) Notice: Subject to any disclaimer, the term of this patent is extended or adjusted under 35 U.S.C. 154(b) by 148 days.

(21) Appl. No.: 12/155,367

(22) Filed: Jun. 3, 2008

(65) Prior Publication Data
US 2010/0028734 A1 Feb. 4, 2010

Related U.S. Application Data

(60) Provisional application No. 60/924,874, filed on Jun. 4, 2007.

(51) Int. Cl.
*H01M 8/04* (2006.01)
(52) U.S. Cl. .................. 429/429; 429/408; 429/416; 429/418
(58) Field of Classification Search .................. 429/12, 429/13, 14, 17, 30, 50, 408, 411, 415, 416, 429/418, 429, 452
See application file for complete search history.

(56) References Cited

U.S. PATENT DOCUMENTS

| | | | |
|---|---|---|---|
| 3,488,266 A | 1/1970 | French | |
| 3,935,028 A | 1/1976 | Strasser et al. | |
| 4,041,210 A | 8/1977 | Van Dine | |
| 4,182,795 A | 1/1980 | Baker et al. | |
| 4,532,192 A | 7/1985 | Baker et al. | |
| 4,543,303 A | 9/1985 | Dantowitz et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |

(Continued)

FOREIGN PATENT DOCUMENTS

| | | |
|---|---|---|
| JP | 2004-247290 A | 9/2004 |
| WO | WO-2004/013258 A1 | 2/2004 |
| WO | WO-2004/093214 A2 | 10/2004 |

OTHER PUBLICATIONS

Calgon Carbon Corp. BPL 4x6 Granular Activated Carbon, 2005.*

(Continued)

*Primary Examiner*—Jennifer K Michener
*Assistant Examiner*—Carlos Barcena
(74) *Attorney, Agent, or Firm*—The Malbury Law Group PLLC (57) ABSTRACT

A fuel cell system includes a fuel cell stack and a PEM stack for providing power to the system in a start up or shut down operating mode and hydrogen to the fuel cell stack in a steady state operating mode.

14 Claims, 2 Drawing Sheets

U.S. PATENT DOCUMENTS

| | | | |
|---|---|---|---|
| 5,302,470 | A | 4/1994 | Okada et al. |
| 5,441,821 | A | 8/1995 | Merritt et al. |
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,955,039 | A | 9/1999 | Dowdy |
| 6,013,385 | A | 1/2000 | DuBose |
| 6,051,125 | A | 4/2000 | Pham et al. |
| 6,106,964 | A | 8/2000 | Voss et al. |
| 6,159,626 | A | 12/2000 | Keskula |
| 6,251,534 | B1 | 6/2001 | McElroy |
| 6,280,865 | B1 | 8/2001 | Eisman et al. |
| 6,294,278 | B1* | 9/2001 | Wohr et al. ............... 429/24 |
| 6,329,090 | B1 | 12/2001 | McElroy et al. |
| 6,348,278 | B1 | 2/2002 | LaPierre et al. |
| 6,403,245 | B1 | 6/2002 | Hunt et al. |
| 6,406,806 | B1 | 6/2002 | Keskula |
| 6,436,562 | B1 | 8/2002 | DuBose |
| 6,451,466 | B1 | 9/2002 | Grasso et al. |
| 6,531,243 | B2 | 3/2003 | Thom |
| 6,569,298 | B2 | 5/2003 | Merida-Donis |
| 6,623,880 | B1 | 9/2003 | Geisbrecht et al. |
| 6,655,150 | B1 | 12/2003 | Åsen |
| 6,692,851 | B2 | 2/2004 | Keskula |
| 6,733,909 | B2 | 5/2004 | Ding |
| 6,821,663 | B2 | 11/2004 | McElroy et al. |
| 6,847,188 | B2 | 1/2005 | Keskula |
| 6,854,688 | B2 | 2/2005 | McElroy et al. |
| 6,924,053 | B2 | 8/2005 | McElroy |
| 7,045,238 | B2 | 5/2006 | Gottmann et al. |
| 2001/0010873 | A1 | 8/2001 | Thom |
| 2001/0049035 | A1 | 12/2001 | Haltiner et al. |
| 2002/0015867 | A1 | 2/2002 | Cargnelli et al. |
| 2002/0028362 | A1 | 3/2002 | Prediger et al. |
| 2002/0051898 | A1 | 5/2002 | Moulthrop et al. |
| 2002/0058175 | A1 | 5/2002 | Ruhl |
| 2002/0106544 | A1 | 8/2002 | Noetzel et al. |
| 2002/0142208 | A1 | 10/2002 | Keefer et al. |
| 2003/0157386 | A1 | 8/2003 | Gottmann et al. |
| 2003/0162067 | A1 | 8/2003 | McElroy |
| 2003/0180602 | A1 | 9/2003 | Finn et al. |
| 2003/0196893 | A1 | 10/2003 | McElroy et al. |
| 2003/0205641 | A1 | 11/2003 | McElroy et al. |
| 2004/0005492 | A1 | 1/2004 | Keefer et al. |
| 2004/0018144 | A1 | 1/2004 | Briscoe |
| 2004/0081859 | A1 | 4/2004 | McElroy et al. |
| 2004/0096713 | A1 | 5/2004 | Ballantine et al. |
| 2004/0115489 | A1 | 6/2004 | Goel |
| 2004/0142215 | A1 | 7/2004 | Barbir et al. |
| 2004/0191597 | A1 | 9/2004 | McElroy |
| 2004/0191598 | A1 | 9/2004 | Gottmann et al. |
| 2004/0202914 | A1 | 10/2004 | Sridhar et al. |
| 2004/0224193 | A1 | 11/2004 | Mitlitsky et al. |
| 2005/0048334 | A1 | 3/2005 | Sridhar et al. |
| 2005/0164051 | A1 | 7/2005 | Venkataraman et al. |
| 2005/0197612 | A1 | 9/2005 | Levin et al. |
| 2005/0214609 | A1 | 9/2005 | McElroy |
| 2006/0029540 | A1* | 2/2006 | Perna et al. ............... 423/651 |
| 2006/0228593 | A1* | 10/2006 | Grieve et al. ............... 429/9 |
| 2006/0251934 | A1 | 11/2006 | Valensa et al. |
| 2007/0017367 | A1 | 1/2007 | McElroy et al. |
| 2007/0017368 | A1 | 1/2007 | Levan et al. |
| 2007/0017369 | A1 | 1/2007 | LeVan et al. |
| 2007/0178338 | A1 | 8/2007 | McElroy et al. |

OTHER PUBLICATIONS

Calgon Carbon Corp. BPL 4×10 Granular Activated Carbon, 2006.*
Calgon Carbon Corp. BPL 6×16 Granular Activated Carbon, 2007.*
Calgon Carbon Corp. BPL 12×30 Granular Activated Carbon, 2008.*
U.S. Appl. No. 60/924,874, filed Jun. 4, 2007, Ballantine et al.
U.S. Appl. No. 10/653,240. filed Sep. 3, 2003, Sridhar et al.
U.S. Appl. No. 11/124,120, filed May 9, 2005, Valensa et al.
U.S. Appl. No. 11/188,118, filed Jul. 25, 2005, Levan et al.
U.S. Appl. No. 11/188,120, filed Jul. 25, 2005, Levan et al.
U.S. Appl. No. 11/188,123, filed Jul. 25, 2007, McElroy et al.
U.S. Appl. No. 11/274,928, filed Nov. 16, 2005, Gottmann et al.
U.S. Appl. No. 11/276,717, filed Mar. 10, 2006, Hickey et al.
U.S. Appl. No. 11/491,487, filed Jul. 24, 2006, McElroy et al.
U.S. Appl. No. 11/491,488, filed Jul. 24, 2006, McElroy et al.
U.S. Appl. No. 11/730,256, filed Mar. 30, 2007, McElroy et al.
U.S. Appl. No. 11/730,255, filed Mar. 30, 2007, Ballantine et al.
U.S. Appl. No. 60/461,190, filed Apr. 9, 2003, Mitlitsky.
"Low Cost, High Efficiency Reversible Fuel Cell (and Electrolyzer) Systems," Proceedings of the 2001 DOE Hydrogen Program Review NREL/CP-570-30535, 8 pgs.
"Small, Ultra Efficient Fuel Cell Systems," Advanced Technology Program ATP 2001 Competition (Jun. 2002), pp. 1-2.
Berlier, Karl et al., "Adsorption of CO2 on Microporous Materials. 1. On Activated Carbon and Silica Gel", J. Chem. Eng. Data, 1997, vol. 42, pp. 533-537.
C.E. Milliken et al., "Low Cost, High Efficiency Reversible Fuel Cell Systems," Proceedings of the 2002 U.S. DOE Hydrogen Program Review, NREL/CP-610-32405, pp. 1-14.
Cell and Stack Construction: Low-Temperature Cells, L.G. Austin, NASA SP-120, 1967.
EG & G, Parsons, Inc., SAIC. Fuel Cell Handbook. 5th Edition. USDOE. Oct. 2000. 9-1-9-4; 9-12-9-14.
F. Mitlitsky et al, Regenerative Fuel Cells for High Altitude Long Endurance Solar Powered Aircraft, 28th Intersociety Energy Conversion Engineering Conference (IECEC), Jul. 28, 1993, UCRL-JC-113485, pp. 1-8.
F. Mitlitsky et al, "Unitized Regenerative Fuel Cells for Solar Rechargeable Aircraft and Zero Emission Vehicles," 1994 Fuel Cell Seminar, Sep. 6, 1994, UCRL-JC-117130, pp. 1-7.
LeVan, M. Douglas et al., "Adsorption and Ion Exchange", Perry's Chemical Engineers' Handbook (7th Edition), 1997, 66 pgs.
LeVan, M. Douglas et al., "Fixed-Bed Adsorption of Gases: Effect of Velocity Variations on Transition Types", AIChE Journal, vol. 34, No. 6, Jun. 1988, pp. 996-1005.
M. P. Kang et al., "Concentration of Carbon Dioxide by a High-Temperature Electrochemical Membrane Cell," Journal of Applied Electrochemistry, vol. 15, No. 3 (1985), pp. 431-439.
Manchado, M. Cabrejas et al., "Adsorption of H2, O2, CO, and CO2 on a ?-Alumina: Volumetric and Calorimetric Studies", Langmuir, vol. 10, 1994, pp. 685-691.
Olivier, Marie-Georges et al., "Adsorption of Light Hyrdocarbons and Carbon Dioxide on Silica Gel", J. Chem. Eng. Data, 1997, vol. 42, pp. 230-233.
Qi, Nan et al., "Adsorption equilibrium modeling for water on activated carbons", Carbon, vol. 43, 2005, pp. 2258-2263.
R.C. Ruhl, "Low Cost Reversible Fuel Cell System," Proceedings of the 2000 U.S. DOE Hydrogen Program Review, Jun. 15, 2000, NREL/CP-570-28890, pp. 1-9.
Rudisill, Edgar N. et al., "Coadsorption of Hydrocarbons and Water on BPL Activated Carbon", Ind. Eng. Chem. Res., 1992, vol. 31, pp. 1122-1130.
S. Jensen et al., "High Temperature Electrolysis of Steam and Carbon Dioxide", Proceedings of Riso International Energy Conference, held at Riso National Laboratory, Denmark, May 19-21, 2003, Riso-R-1405(CN), pp. 204-215.
Shaffer, Steven, "Development Update on Delphi's Solid Oxide Fuel Cell System", 2004 SECA Review Meeting, 34 pgs., http://www.netl.doe.gov/publications/proceedings/04/seca-wrkshp/Delphi%20-%20Shaffer.pdf.

Sward, Brian K. et al., "Frequency Response Method for Measuring Mass Transfer Rates in Adsorbents via Pressure Perturbation", Adsorption, vol. 9, 2003, pp. 37-54.

Sward, Brian K. et al., "Simple Flow-Through Apparatus for Measurement of Mass Transfer Rates in Adsorbent Particles by Frequency Response", Fundementals of Adsorption, K. Kaneko et al., eds., vol. 7, 2002, pp. 29-36. Published by IK International of Japan.

Walton, Krista S. et al., "A Novel Adsorption Cycle for CO2 Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of carbon dioxide at high temperature—a review", Separation and Purification Technology, vol. 26, 2002, pp. 195-205.

Yong, Zou et al., "Adsorption of Carbon Dioxide on Basic Alumina at High Temperatures", J. Chem. Eng. Data, 2000, vol. 45, pp. 1093-1095.

Zizelman, James et al., "Solid Oxide Fuel Cell Auxiliary Power Unit—A Development Update", SAE2002, World Congress, Mar. 4-7, 2002, SAE Technical Paper Series 2002-01-0411, 10 pgs.

* cited by examiner

METHOD FOR HIGH TEMPERATURE FUEL CELL SYSTEM START UP AND SHUTDOWN

CROSS-REFERENCE TO RELATED PATENT APPLICATIONS

The present application claims benefit of U.S. provisional application 60/924,874, filed Jun. 4, 2007, which is incorporated herein by reference in its entirety.

BACKGROUND OF THE INVENTION

The present invention relates generally to the field of fuel cells, particularly to solid oxide fuel fells.

Fuel cells are electrochemical devices which can convert energy stored in fuels to electrical energy with high efficiencies. High temperature fuel cell systems, such as solid oxide fuel cell (SOFC) systems and molten carbonate fuel cell (MCFC) systems, require significant heat-up times to reach normal operating (steady state) temperature and significant cool down for safe shutdown. In start up times, a power source must be provided to drive components which are used during the heat-up. For example, electric heaters or blowers for air supplied to catalytic reactors must be powered. Normally, the power supply for these start up components is either the grid or a distributed generator such as an internal combustion engine fueled by diesel or gasoline fuel. In some cases a battery supply, previously charged by a battery charger powered by the grid may also be utilized. However, this methodology is inefficient. Furthermore, during the significant heat up time for system start up and cool down time for shutdown, a stored anode purge gas is used to prevent anode oxidation when steam reformed fuel is not available. The anode purge gas is stored within the system and replenished periodically based on usage rates. The purge gas storage container takes up valuable space in the system.

SUMMARY

In one embodiment a fuel cell system comprises a fuel cell stack and a means for providing power to said system in at least one of start up or shut down operating modes and hydrogen to said fuel cell stack in the steady state operating mode. Preferably, the means for providing power and hydrogen comprises a PEM stack fluidly connected to the fuel cell stack.

In another embodiment, a method of operating a fuel cell system comprising a fuel cell stack, and a PEM stack, comprising the steps of (i) operating said fuel cell system in at least one of start up or shut down operating modes by providing a fuel inlet stream to the PEM stack, and providing power from the PEM stack to said system components, and (ii) operating said fuel cell system in a steady state operating mode by providing a fuel inlet stream to the fuel cell stack, providing a fuel exhaust stream from the fuel cell stack to the PEM stack, and providing a hydrogen stream from the PEM stack to the fuel inlet stream.

In another embodiment, a fuel cell system comprises a fuel cell stack, and a PEM stack adapted to provide power to said system in at least one of start up or shut down operating modes and hydrogen to said fuel cell stack in a steady state operating mode.

DETAILED DESCRIPTION OF THE PREFERRED EMBODIMENTS

The present embodiments of the invention provide a fuel cell system with improved efficiency in terms of power usage, fuel usage or both. In another aspect, embodiments of the invention provide a fuel cell system comprising a proton exchange membrane (PEM) stack for providing power to system components during start up operating mode. In a further aspect, the PEM stack provides hydrogen to the SOFC stack in the steady state operating mode.

In one embodiment the fuel cell system comprises a fuel cell stack and a means for providing power to said system in the start up and/or shut down operating mode and hydrogen to said fuel cell stack in the steady state operating mode. Preferably, the means for providing power and hydrogen comprises a PEM stack. Optionally, said means comprises both a PEM stack and a catalytic partial oxidizing reactor (CPOx). The system can be configured such that the CPOx reactor provides fuel to the PEM stack which in turn powers the system components during the start up and/or shut down operating mode. The PEM stack can be operated to provide hydrogen instead of power in the steady state operating mode.

In another embodiment, a method of operating a fuel cell system comprising a SOFC stack, a CPOx reactor and a PEM stack, comprises the steps of (a) operating said fuel cell system in a start up and/or shut down operating mode by providing a fuel inlet stream to the CPOx reactor, providing a fuel stream from the CPOX reactor to the PEM stack and providing power from the PEM stack to the system components and (b) operating the fuel cell system in a steady state operating mode by providing a fuel stream to the SOFC stack and providing a stream of hydrogen from the PEM stack to the fuel inlet stream.

The above described fuel cell systems are very power-efficient in the start up mode. A very small battery set may be used to provide power while the CPOx reactor is started and the PEM stack is heated. Following this, the system is self-sustaining. Therefore, the required energy for start up via either grid, distributed gen-set (diesel generator), or battery set is significantly reduced. Furthermore, when comparing the system with a prior art system containing the distributed diesel generator, start up emissions and $CO_2$ penalty is reduced because power for start up is generated by a PEM fuel cell.

Another attractive aspect of the system is that for fuels cell systems already employing a PEM stack for hydrogen for $H_2$ purification, $H_2$ generation or efficiency enhancement, the PEM stack also doubles as a power generating unit in the start up and/or shut down mode. In another embodiment of the invention, the system also produces an anode oxide preventing purge gas (e.g., a gas that prevents a metal in the anode electrode, such as nickel, from oxidizing and forming a metal oxide, such as nickel oxide), negating the need to store special anode oxide preventing purge gas in the system. This reduces the overall system footprint and the servicing associated with refilling the anode purge gas tanks. The purge gas is a dilute fuel generated on demand from the fuel inlet stream (such as a natural gas inlet stream) by the CPOx reactor. Such dilute fuel is acceptable for hot box emergency purging.

Generally, a fuel cell system may be regarded as operating in the start up mode when the main power generating fuel cell stack (e.g. SOFC stack) has not reached operating conditions (e.g. high enough temperature.) Once the desired conditions are achieved, the system may be placed in the steady state operation mode, by for example redirecting and/or introducing fuel and power to various components. Once the system is shut down, it is in shut down mode while it cools down. As such, the fuel inlet stream is switcheably provided to certain units such as, but not limited to, the CPOx reactor and the SOFC stack.

The present embodiments include operating the aforementioned fuel cell systems in start up and/or shut down mode, steady state mode or both. Furthermore, the methods described herein may be carried out while switching from start up to steady state mode, from steady state mode to shut down mode or both. The SOFC stack is heated (started) or cooled (shut down) by regulating the SOFC air flow and reformate (i.e., reformed fuel) flow rates.

In a particular embodiment, a fuel cell system is switched from the steady state mode to the start up mode. As such, the PEM stack is switched from hydrogen pumping mode (electrolysis mode) to power generating mode (fuel cell mode), for example to power up heating units. This may be desirable for various reasons such as when there is a failure of the main balance of plant (BOP) or high temperature stack hot box in order to keep that structure hot and protected while waiting for service personnel to arrive. Alternatively, the fuel cell system is switched from the steady state mode to the shut down mode. The PEM stack is switched from hydrogen pumping mode (electrolysis mode) to power generating mode (fuel cell mode), to provide power to auxiliary components while the system cools down.

The examples provided herein describe fuel cell systems preferably comprising a SOFC stack. However, it should be readily understood by one skilled in the art that other fuel cell types, such as MCFCs, may be equally applicable. A detailed description of a SOFC system is described in U.S. patent applications Ser. No. 11/491,487 (filed Jul. 24, 2006), Ser. No. 11/002,681 (filed Dec. 3, 2004) and Ser. No. 11/730,255 (filed Mar. 30, 2007) all hereby incorporated by reference in their entirety.

Figure 1:
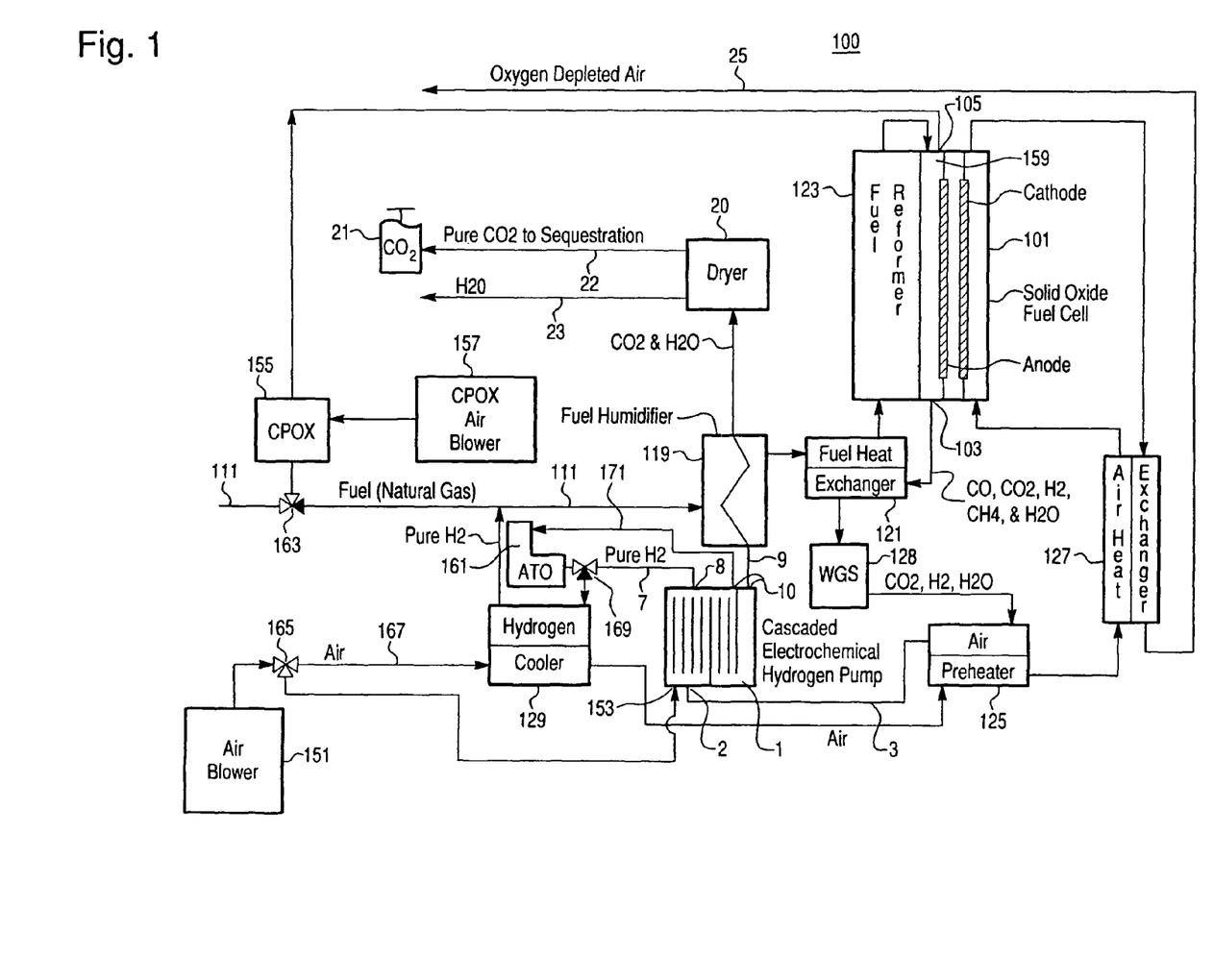
FIG. 1 is a schematic diagram of a fuel cell system in start up operating mode.

A non-limiting example of a fuel cell system 100 in start up and/or shut down mode is shown in FIG. 1. The fuel cell system 100 contains a fuel cell stack 101, such as a solid oxide fuel cell stack (illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite). During the start up and/or shut down operating mode, air and fuel are provided to a CPOx reactor 155 via a CPOx air blower 157 and a hydrocarbon fuel inlet conduit 111 respectively (see FIG. 1). The air valve 165 directs air from blower 151 to a second inlet 153 of PEM stack 1, and shuts off the air inlet conduit 167 to the SOFC stack 101. A fuel inlet valve 163 is switched to direct the fuel inlet stream to the CPOx reactor. As shown, fuel flow to the fuel humidifier 119 is switched off. The reformate produced in the CPOx reactor 155 is then provided to the PEM stack 1 through the SOFC stack 101. Alternatively, during the start up and/or shut down mode, the reformate from the CPOx reactor 155 bypasses the SOFC stack 101. The reformate generated in the CPOx reactor 155 is hydrogen rich and also contains CO gas. The reformate is used as a purge gas to prevent anode oxidation during start up and shut down. Therefore, the PEM stack 1 utilized is preferably CO tolerant. The PEM stack typically requires lower operating temperatures than the SOFC stack. During start up mode, electric heaters or CPOx reactor heat could be used to heat the PEM stack to normal operating temperature.

The PEM stack 1 consumes reformate and oxygen provided by the main cathode blower 151, to produce DC power. If desired, a single air blower may be used in place of separate blowers 151 and 157. The DC power can be converted to AC, and used to power auxiliary components (not shown) of the fuel system. As used herein "auxiliary component" includes essentially any component in a typical fuel cell system which requires power during the start up and/or shut down mode. The air and fuel exhaust streams of the PEM stack 1 are directed to an anode tail gas oxidizer 161 (ATO) via conduits 7 and 171 and valve 169. While the ATO is shown separately from the stack 101, the ATO may be thermally integrated with the reformer 123 and stack 101 as described in U.S. application Ser. No. 11/002,681 filed on Dec. 3, 2004, and incorporated herein by reference in its entirety.

Figure 2:
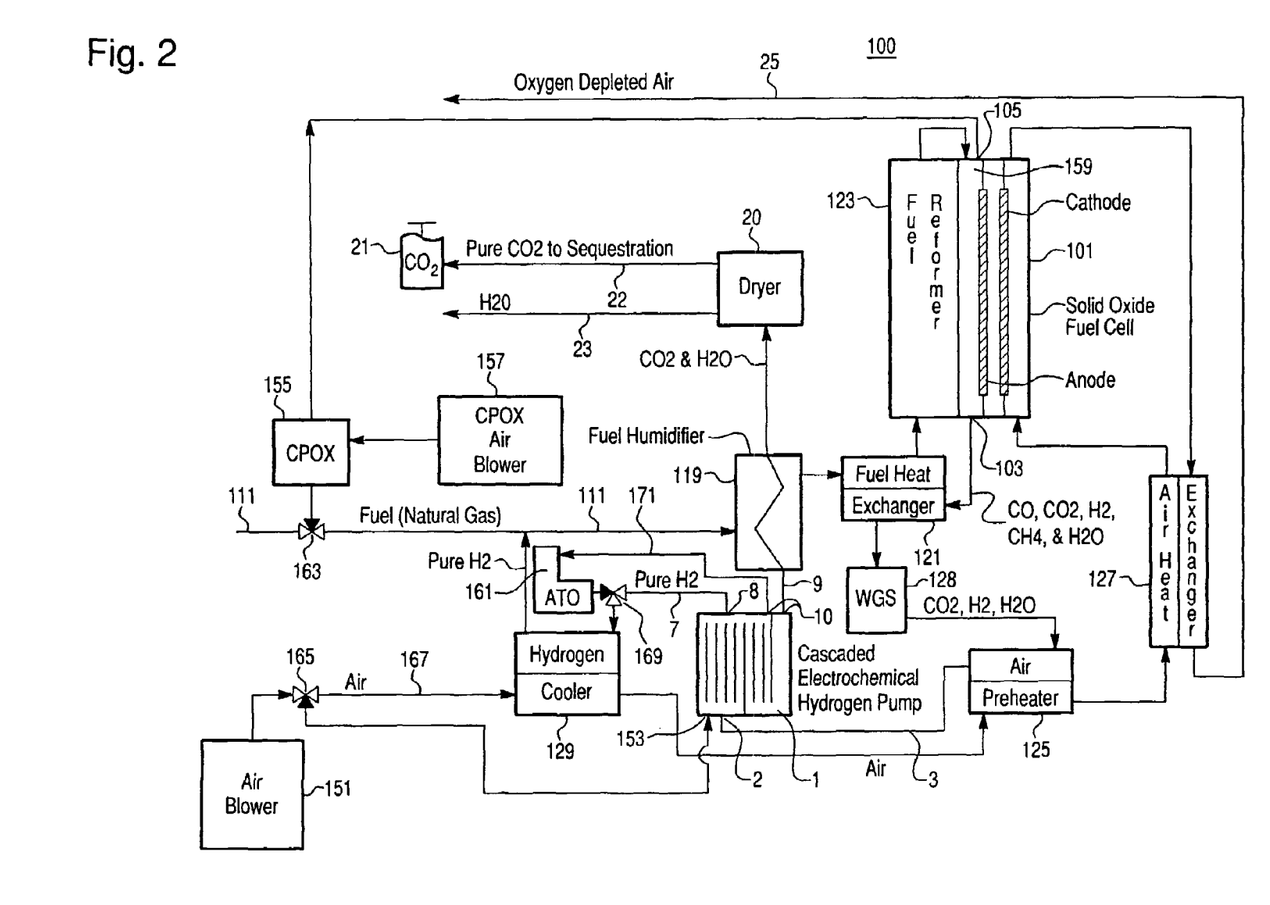
FIG. 2 is a schematic diagram of a fuel cell system in steady state operating mode.

A non-limiting example of the system in steady state operation mode is shown in FIG. 2. Once the system 100 reaches the steady state mode, the PEM cell stack 1 is operated in $H_2$ pumping mode (electrolysis) to separate hydrogen from the SOFC stack 101 fuel exhaust stream. Accordingly, power and the SOFC fuel exhaust stream are provided to the PEM stack 1, which generates a hydrogen stream that can be combined with the SOFC fuel inlet stream, for example at the hydrocarbon fuel inlet conduit 111, via the hydrogen cooler 129. This feature can enhance the system efficiency since the hydrogen stream can be combined with the fuel inlet stream to increase the concentration of hydrogen therein. In this mode, the fuel inlet valve 163, is switched to close fuel flow to the CPOx reactor 155 and allow fuel flow to the humidifier 119, and eventually the SOFC stack 101. The air valve 165 is switched to provide air to the SOFC stack air inlet conduit 167 and closes off the air inlet to PEM stack 1.

In order to increase the working life of the PEM stack 1, an inert purge gas could be flowed through the stacks prior to switching operating modes. Alternatively, instead of flowing a purge gas through the PEM stack 1, it is possible to electrochemically prepare the PEM stack for the transition between fuel cell mode (power generating) and $H_2$ pumping (electrolysis) mode. If the PEM stack has been operating in $H_2$ pumping mode, the hydrogen from the $H_2$ pump "cathode" may be pumped to the anode, creating a vacuum on the "cathode." Then, air may be flowed to the cathode without risk of $H_2+O_2$ oxidation reaction damaging the cell. If the PEM stack has been operating in fuel cell mode, the anode and cathode terminals may be shorted through a resistor, thereby causing a reaction between anode hydrogen and cathode oxygen. After this is completed, pumping may be initiated when the fuel cell voltage has dropped to zero, indicating that oxygen reactant is depleted from the fuel cell "cathode."

Any suitable proton conducting stack may be used in stack 1, such as PEM stacks using Nafion membranes with CO tolerant catalysts, PBI membranes (phosphoric acid loaded membranes) adapted for operating at elevated temperatures, and solid acid electrolytes, all of which are examples of proton conducting fuel cell which could operate either in fuel cell mode or in $H_2$ pumping mode as desired.

The PEM stack 1 shown in the embodiments FIGS. 1 and 2 may optionally be a cascaded PEM stack. In the hydrogen pump mode this unit electrochemically separates hydrogen from the fuel exhaust stream in the steady state operation mode. The PEM stack 1 may comprise any suitable proton exchange membrane device comprising a polymer electrolyte. The hydrogen diffuses through the polymer electrolyte under an application of a potential difference between anode and cathode electrodes located on either side of the electrolyte. The anode, cathode, and polymer electrolyte together comprise a membrane cell. In a cascaded PEM stack, several sets of cells are arranged in process fluid flow series so that the exhaust from one set of cells is used as an input for the next set of cells. In each set of two or more cells, at least two cells are arranged in parallel, such that the input stream is divided among the cells in the set. In other words, any one cell in one set is in process fluid flow series configuration with any one other cell in a different set, but all cells in each set are preferably in process fluid flow parallel configuration with respect to each other. The PEM stack 1 may contain two or more sets of cells, such as three to five sets of cells. Each set of cells may contain one or more cells, such as one to twenty cells. Preferably, but not necessarily, each set contains more cells than the set(s) located downstream from it. For example, in a case of a PEM stack having three sets of cells arranged in series, the PEM stack separates hydrogen from the exhaust stream in a three step sequence. First, a quantity (X) of fuel exhaust is provided simultaneously to a first set of cells having for example four cells, and a first portion (A) of hydrogen is separated. Second, a remaining quantity (X−A) of fuel exhaust is provided to a second set of cells having for example two cells, and a second portion (B) of hydrogen is separated. Third, a remaining quantity (X−A−B) of fuel exhaust is provided to the third set of cells having one cell, and a third portion (C) of hydrogen is separated. With reference to FIG. 2, the separated hydrogen (A+B+C) can be provided into conduit 7 through output 8. The remaining portion of the fuel exhaust consisting essentially of carbon dioxide and water is provided into conduit 9 through output 10. The total quantity of separated hydrogen (A+B+C) is at least 95%, such as 95% to about 100% of the hydrogen contained in the quantity (X) of fuel exhaust provided to the PEM stack 1. The term "hydrogen" as used herein excludes hydrocarbon hydrogen atoms. For example, hydrogen includes molecular hydrogen ($H_2$).

Preferably, the PEM stack 1 comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893, incorporated herein by reference in its entirety. These cells generally operate in a temperature range of above 100 to about 200 degrees Celsius. Thus, the heat exchangers in the system 100 preferably keep the fuel exhaust stream at a temperature of about 120 to about 200 degrees Celsius, such as about 160 to about 190 degrees Celsius.

Also preferably, the PEM stack utilized should have at least all four of anode inlet, anode outlet, cathode inlet and cathode outlet flow connections. This facilitates functioning in both $H_2$ pumping mode and fuel cell mode.

The system 100 also contains the first conduit 3 which operatively connects a fuel exhaust outlet 103 of the fuel cell stack 101 to a first inlet 2 of the PEM stack 1. The system also contains a second conduit 7 which operatively connects a first outlet 8 of the PEM stack 1 to a fuel inlet 105 of the fuel cell stack 101. Preferably, the system 100 lacks a compressor which in operation compresses the fuel cell stack fuel exhaust stream to be provided into the PEM stack 1. The system 100 also contains a third conduit 9 which operatively connects a second outlet 10 of the PEM stack 1 to an exhaust waste containment unit 21, such as a carbon dioxide storage tank for sequestering exhaust waste, such as carbon dioxide and/or water. Preferably, the conduit 9 is also connected to a dryer 20 that separates the carbon dioxide from the water contained in the exhaust stream. The dryer 20 can use any suitable means for separating carbon dioxide from water, such as separation based on differences in melting point, boiling point, vapor pressure, density, polarity, or chemical reactivity. Preferably, the separated carbon dioxide is substantially free of water and has a relatively low dew point. Preferably, the separated carbon dioxide is sequestered in the containment unit 21 in order to minimize greenhouse gas pollution by the system 100.

The system 100 further preferably contains a fuel humidifier 119 having a first inlet operatively connected to a hydrocarbon fuel source, such as the hydrocarbon fuel inlet conduit 111, a second inlet operatively connected to the fuel exhaust outlet 103, a first outlet operatively connected to the fuel cell stack fuel inlet 105, and a second outlet operatively connected to the dryer 20. In operation, the fuel humidifier 119 humidifies a hydrocarbon fuel inlet stream from conduit 111 containing the recycled hydrogen using water vapor contained in a fuel cell stack fuel exhaust stream. The fuel humidifier may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, which published as U.S. Published Application Number 2003/0162067, all of which are incorporated herein by reference in their entirety. For example, one suitable type of humidifier comprises a water vapor and enthalpy transfer Nafion® based, water permeable membrane available from Perma Pure LLC. The humidifier passively transfers water vapor and enthalpy from the fuel exhaust stream into the fuel inlet stream to provide a 2 to 2.5 steam to carbon ratio in the fuel inlet stream. The fuel inlet stream dew point temperature may be raised to about 80 to about 90 degrees Celsius in the humidifier.

The system 100 also contains a recuperative heat exchanger 121 which exchanges heat between the stack fuel exhaust stream and the hydrocarbon fuel inlet stream being provided from the humidifier 119. The heat exchanger helps to raise the temperature of the fuel inlet stream and reduces the temperature of the fuel exhaust stream so that it may be further cooled downstream and such that it does not damage the humidifier.

If the fuel cells are external fuel reformation type cells, then the system 100 contains a fuel reformer 123. The reformer 123 reforms a hydrocarbon fuel containing inlet stream into hydrogen and carbon monoxide containing fuel stream which is then provided into the stack 101. The reformer 123 may be heated radiatively, convectively and/or conductively by the heat generated in the fuel cell stack 101 and/or by the heat generated in an optional burner/combustor, as described in U.S. patent application Ser. No. 11/002,681, filed Dec. 2, 2004, which published as U.S. Published Application Number 2005/0164051, incorporated herein by reference in its entirety. Alternatively, the external reformer 123 may be omitted if the stack 101 contains cells of the internal reforming type where reformation occurs primarily within area 159 of the fuel cells of the stack.

Optionally, the system 100 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 100 also preferably contains an air heat exchanger 127. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device. The system also optionally contains a hydrogen cooler heat exchanger 129 which cools the separated hydrogen stream provided from unit 1, using an air stream, such as an air inlet stream.

The system may also contain an optional water-gas shift reactor 128. The water-gas shift reactor 128 may be any suitable device which converts at least a portion of the water in the fuel exhaust stream into free hydrogen. For example, the reactor 128 may comprise a tube or conduit containing a catalyst which converts some or all of the carbon monoxide and water vapor in the fuel exhaust stream into carbon dioxide and hydrogen. Preferably, the reactor 128 lowers the concentration of the remaining methane and carbon monoxide in the fuel exhaust stream to trace levels, such as less than about 1,500 ppm. Thus, the reactor 128 increases the amount of hydrogen in the fuel exhaust stream. The catalyst may be any suitable catalyst, such as a iron oxide or a chromium promoted iron oxide catalyst. The reactor 128 may be located between the fuel heat exchanger 121 and the air preheater heat exchanger 125.

During steady state mode, the fuel inlet stream is provided into the fuel cell stack 101 through fuel inlet conduit 111. The fuel may comprise any suitable fuel, such as a hydrocarbon fuel, including but not limited to methane, natural gas which contains methane with hydrogen and other gases, propane, methanol, ethanol or other biogas, or a mixture of a carbon fuel, such as carbon monoxide, oxygenated carbon containing gas, such as ethanol, methanol, or other carbon containing gas with a hydrogen containing gas, such as water vapor, $H_2$ gas or their mixtures. For example, the mixture may comprise syngas derived from coal or natural gas reformation.

The fuel inlet stream passes through the humidifier 119 where moisture is added to the fuel inlet stream. The humidified fuel inlet stream then passes through the fuel heat exchanger 121 where the humidified fuel inlet stream is heated by the fuel cell stack fuel exhaust stream. The heated and humidified fuel inlet stream is then provided into a reformer 123, which is preferably an external reformer. For example, reformer 123 may comprise a reformer described in U.S. patent application Ser. No. 11/002,681, filed on Dec. 2, 2004, which published as U.S. Published Application Number 2005/0164051, incorporated herein by reference in its entirety. The fuel reformer 123 may be any suitable device which is capable of partially or wholly reforming a hydrocarbon fuel to form a carbon containing and free hydrogen containing fuel. For example, the fuel reformer 123 may be any suitable device which can reform a hydrocarbon gas into a gas mixture of free hydrogen and a carbon containing gas. For example, the fuel reformer 123 may comprise a nickel and rhodium catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, the humidifier 119 is located upstream of the heat exchanger 121 which is located upstream of the reformer 123 which is located upstream of the stack 101.

The air or other oxygen containing gas (i.e., oxidizer) inlet stream is preferably provided into the stack 101 from blower 151 through valve 165 conduit 167 and through a heat exchanger 127, where it is heated by the air (i.e., cathode) exhaust stream from the fuel cell stack. If desired, the air inlet stream may also pass through the hydrogen cooler heat exchanger 129 and/or through the air preheat heat exchanger 125 to further increase the temperature of the air before providing the air into the stack 101. Preferably, no fuel is combusted with air.

Once the fuel and air are provided into the fuel cell stack 101, the stack 101 is operated to generate electricity and a hydrogen containing fuel exhaust stream. About 25% of the input fuel exits the fuel exhaust outlet 103 of the stack. The fuel exhaust stream (i.e., the stack anode exhaust stream) is provided from the stack fuel exhaust outlet 103 into the PEM stack 1. At least 95% of hydrogen contained in the fuel exhaust stream is separated in the PEM stack 1, for example at least 99%, such as about 100%, of the hydrogen contained in the fuel exhaust stream is separated in the unit 1. The hydrogen separated from the fuel exhaust stream in the PEM stack 1 can be then provided back into the fuel inlet stream. Preferably, the hydrogen is provided back into the fuel inlet conduit 111 upstream of the humidifier 119. The exhaust stream is provided to the dryer 20 which separates carbon dioxide from water. The separated carbon dioxide is provided through conduit 22 for sequestration in tank 21. For example, if the fuel cell stack 101 comprises a solid oxide regenerative fuel cell stack, then with the aid of a Sabatier reactor, the sequestered carbon dioxide can be used to generate a hydrocarbon fuel, such as methane, when the stack 101 operates in the electrolysis mode, as described in U.S. Pat. No. 7,045, 238, incorporated herein by reference in its entirety. The separated water from dryer 20 is available for humidification of the fuel inlet stream or other industrial uses. For example, conduit 23 may provide the water from the dryer 20 back into the humidifier 119, into a steam generator (not shown) and/or directly into the fuel inlet conduit 111.

The fuel exhaust stream is provided into the PEM stack 1 as follows. The fuel exhaust stream may contain hydrogen, water vapor, carbon monoxide, carbon dioxide, some unreacted hydrocarbon gas, such as methane and other reaction by-products and impurities. This exhaust stream is first provided into the heat exchanger 121, where its temperature is lowered, preferably to less than 200 degrees Celsius, while the temperature of the fuel inlet stream is raised. If the water-gas shift reactor 128 and the air preheater heat exchanger 125 are present, then the fuel exhaust stream is provided through the reactor 128 to convert at least a portion of the water vapor and a majority of the residual carbon monoxide into carbon dioxide and hydrogen. The fuel exhaust stream is then passed through the heat exchanger 125 to further lower its temperature while raising the temperature of the air inlet stream. The temperature may be lowered to 120 to 180 degrees Celsius for example.

The fuel exhaust stream is then provided into inlet 2 of the PEM stack 1 via conduit 3. During the separation step in PEM stack 1, at least a majority of the hydrogen, such as at least 95% of the hydrogen in the fuel exhaust stream, diffuses through the electrolyte of the cells in the PEM stack 1, while allowing the water vapor, carbon dioxide, and any remaining trace amounts of carbon monoxide and hydrocarbon gas in the fuel exhaust stream to be passed through conduit 9 to the humidifier 119. Preferably, the PEM stack 1 separates at least 99% of the hydrogen in the fuel exhaust stream, such as about 100%.

In the fuel humidifier 119, a portion of the water vapor in the fuel exhaust stream is transferred to the fuel inlet stream to humidify the fuel inlet stream. The hydrocarbon and hydrogen fuel inlet stream mixture is humidified to 80 C to 90 C dew point. The remainder of the fuel exhaust stream is then provided into the dryer 20. The dryer 20 then separates the carbon dioxide from the water contained in the exhaust stream. The dry, substantially hydrogen free separated carbon dioxide is then provided to the containment unit 21 for sequestration, and the separated water is available for humidification of the fuel inlet stream or other industrial uses. Thus, the environmentally friendly system preferably contains no burner and the fuel exhaust is not combusted with air. The only exhaust from the system consists of three streams—water, sequestered carbon dioxide and oxygen depleted air cathode exhaust stream through conduit 25.

The hydrogen separated from the fuel exhaust stream is then removed from PEM stack 1 through outlet 8 and conduit 7 and provided into the hydrocarbon fuel inlet stream in the fuel inlet conduit 111 with valve 169 closing off flow to ATO 161. If desired, prior to being provided to the fuel inlet conduit, the hydrogen stream may be passed through a hydrogen cooler heat exchanger 129, where the hydrogen stream exchanges heat with an air stream, such as the air inlet stream provided into the fuel cell stack 101. The temperature of the hydrogen stream is lowered in the heat exchanger 129 before being provided into the fuel inlet conduit, while the temperature of the air inlet stream is raised. Thus, the hydrocarbon fuel inlet stream is mixed with a low dew point, near ambient temperature recycled hydrogen recovered from the anode tail gas with a PEM stack 1.

Thus, with respect to the fuel exhaust stream, the heat exchanger 121 is located upstream of the reactor 128, which is located upstream of the heat exchanger 125, which is located upstream of the PEM stack, which is located upstream of the humidifier 119 and the fuel inlet conduit 111.

If desired, all or a portion of the hydrogen separated from PEM stack 1 may be provided to a hydrogen using device, such as a PEM fuel cell in a vehicle or another hydrogen using device or to a hydrogen storage vessel. In this case, a selector valve may be placed in conduit 7 to either split the hydrogen stream between the fuel inlet conduit 111 and the hydrogen storage vessel or hydrogen using device, or to alternate the hydrogen flow between the fuel inlet conduit 111 and the hydrogen storage vessel or hydrogen using device. Any component of the system 100 may be operated by a computer or an operator to controllably vary the gas flow based on one or more of the following conditions: i) detected or observed conditions of the system 100 (i.e., changes in the system operating conditions requiring a change in the amount of hydrogen in the fuel inlet stream); ii) previous calculations provided into the computer or conditions known to the operator which require a temporal adjustment of the hydrogen in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

It is believed that by recycling at least a portion of the hydrogen from the fuel exhaust (i.e., tail) gas stream into the fuel inlet stream, a high efficiency operation of the fuel cell system is obtained. Furthermore, the overall fuel utilization is increased. For example, at least 95% of the hydrogen in the fuel exhaust is separated by the PEM stack 1 and recycled back to the stack 101. Preferably at least 99%, such as about 100%, of the fuel exhaust gas hydrogen is separated by the PEM stack 1 and recycled back to the stack 101. The "overall" or "effective" fuel utilization of a system having a given "per pass" fuel utilization rate is typically greater than the percentage of hydrogen recycled by such a system. For example, a system that recycles only 85% of the fuel exhaust gas hydrogen has an effective fuel utilization of about 94% to about 95%, if its per pass utilization is about 75%. Such a system would have an AC electrical efficiency of about 50% to about 60%, such as about 54% to 60%. In contrast, if the instant system PEM stack 1 includes a cascaded PEM stack 1, which recycles at least 95% of exhaust hydrogen, it then operates at a higher overall fuel efficiency (greater than 95%) and a higher AC electrical efficiency greater than 60%. Even higher efficiency may be obtained by increasing the per pass fuel utilization rate above 75%, such as about 76-80%. At steady-state, there is no need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in overall fuel utilization and the removal of heat requirement to generate steam increases the overall electrical efficiency. In contrast, a system that does not recycle any of the exhaust hydrogen has an AC electrical efficiency of only about 45%, assuming equivalent per pass utilization.

The fuel cell system described herein may have other embodiments and configurations, as desired. Other components may be added if desired, as described, for example, in U.S. application Ser. No. 10/300,021, filed on Nov. 20, 2002 and published as U.S. Published Application Number 2003/0157386, in U.S. Provisional Application Ser. No. 60/461,190, filed on Apr. 9, 2003, and in U.S. application Ser. No. 10/446,704, filed on May 29, 2003 and published as U.S. Published Application Number 2004/0202914, all of which are incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system comprising a fuel cell stack, and a PEM stack, said method comprising:
    operating said fuel cell stack in a steady state operating mode by: providing a fuel inlet stream to the fuel cell stack; providing a fuel exhaust stream from the fuel cell stack to the PEM stack; and providing a hydrogen stream from the PEM stack to the fuel inlet stream; and
    switching from the steady state operating mode to a shut down operating mode and operating said fuel cell stack in said shut down operating mode by: providing a fuel inlet stream to the PEM stack; providing an air stream to the PEM stack; and providing power from the PEM stack to at least one auxiliary component of the system.

2. The method of claim 1, wherein the fuel cell system further comprises a CPOx reactor.

3. The method of claim 2, wherein the shut down operating mode comprises providing the fuel inlet stream to the CPOx reactor and providing fuel reformate fuel inlet stream from the CPOx reactor to the PEM stack.

4. The method of claim 1, wherein the steady state operating mode comprises providing power to the PEM stack to operate the PEM stack in electrolysis mode to separate hydrogen from fuel cell stack fuel exhaust stream and to provide the separated hydrogen into the fuel inlet stream.

5. The method of claim 1, further comprising providing power from the PEM stack to said at least one auxiliary component in a start up operating mode.

6. The method of claim 1, wherein the PEM stack is CO-tolerant.

7. The method of claim 1, wherein the fuel cell stack comprises a SOFC stack or a MCFC stack.

8. The method of claim 7, further comprising providing a purge gas from a CPOx reactor to the SOFC stack anode electrodes during the shut down operating mode to prevent the anode electrodes from oxidizing.

9. A method of operating a fuel cell system comprising a fuel cell stack, and a PEM stack, said method comprising:
   operating said fuel cell stack in a start up operating mode by: providing a fuel inlet stream to the PEM stack; providing an air stream to the PEM stack; and providing power from the PEM stack to at least one auxiliary component of the system;
   switching from the start up operating mode to a steady state operating mode and operating said fuel cell stack in said steady state operating mode by: providing a fuel inlet stream to the fuel cell stack; providing a fuel exhaust stream from the fuel cell stack to the PEM stack; providing power to the PEM stack to operate the PEM stack in electrolysis mode to separate hydrogen from fuel cell stack exhaust stream; and providing the separated hydrogen stream from the PEM stack to the fuel inlet stream of the fuel cell stack; and
   switching from the steady state operating mode to a shut down operating mode and operating said fuel cell stack in said shut down operating mode by: providing a fuel inlet stream to the PEM stack; providing an air stream to the PEM stack; and providing power from the PEM stack to the at least one auxiliary component of the system.

10. The method of claim 9, wherein the fuel cell system further comprises a CPOx reactor.

11. The method of claim 10, wherein the at least one of start up or shut down operating modes comprises providing the fuel inlet stream to the CPOx reactor and providing fuel reformate fuel inlet stream from the CPOx reactor to the PEM stack.

12. The method of claim 9, wherein the PEM stack is CO-tolerant.

13. The method of claim 9, wherein the fuel cell stack comprises a SOFC stack or a MCFC stack.

14. The method of claim 13, further comprising providing a purge gas from a CPOx reactor to the SOFC stack anode electrodes during at least one of the start up or the shut down modes to prevent the anode electrodes from oxidizing.

* * * * *